United States Patent Office 3,105,094
Patented Sept. 24, 1963

3,105,094
5,5'-DI-TERT.-ALKYL SUBSTITUTED 2,2',4,4'-TETRAHYDROXYBENZOPHENONES
Guenther K. Hoeschele, Wilmington, Del., assignor to E. I. du Pont de Nemours and Company, Wilmington, Del., a corporation of Delaware
No Drawing. Filed Oct. 3, 1960, Ser. No. 59,806
4 Claims. (Cl. 260—591)

This invention is directed to materials which absorb ultra-violet radiation; these materials are significantly useful as photostabilizers.

Many organic compounds are known which absorb light rays within the region of 3,000 to 4,000 A.; some have been employed to make ultra-violet filters. For example, when these compounds are uniformly incorporated in transparent films, the resulting composition will transmit only those light waves which are not absorbed by the combination present. Since harmful light rays can be selectively absorbed, protection can be extended to materials which are sensitive to these rays.

For many applications, the ultra-violet screening agent must be highly effective in the region from about 3500 to 4000 A. 2,2',4,4'-tetrahydroxybenzophenone is known to absorb in this range. However, this compound provides only limited protection for certain substrates such as polyurethanes. Moreover it displays limited solubility in nonpolar organic materials.

It is an object of the present invention to provide significantly superior ultra-violet absorbers for light rays in the region of 3500 to 4000 A. It is a further object of the present invention to provide novel benzophenone ultraviolet light absorbers which have significant utility in fibers, films, and coatings. These and other objects will be apparent in the following description and claims.

More specifically, the present invention is directed to new ultra-violet absorbers having the following structure

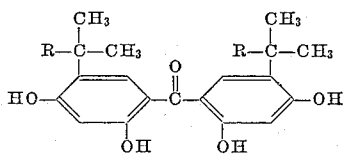

where R is $C_1$—$C_2$ alkyl, with the proviso that both R's need not be the same.

Representative compounds of the present invention are: 5,5'-di-tert-butyl-2,2',4,4'-tetrahydroxybenzophenone, which is preferred, 5,5'-di-tert-amyl-2,2',4,4'-tetrahydroxybenzophenone, and 5'-tert-amyl-5-tert-butyl-2,2',4,4'-tetrahydroxybenzophenone.

The benzophenones of the present invention are made by alkylating 2,2',4,4'-tetrahydroxybenzophenone with terminally unsaturated hydrocarbons such as isobutylene or 2-methylbutene-1 in the presence of an acidic catalyst. At most one alkyl group is introduced into a single ring of the benzophenone. These alkyl groups can be different when mixtures of olefins are used or when different olefins are introduced sequentially by partial alkylation.

The alkylation is carried out at 60–75° C. (65–70° C. preferred). The olefin is introduced over a period of about 1 to 5 hours, into a well-agitated mixture containing 2,2',4,4'-tetrahydroxybenzophenone, the acidic catalyst, and an inert hydrocarbon or chlorinated hydrocarbon (which dissolves the benzophenone during the alkylation). About 3.1 to 4 moles of olefin are employed for every mole of the 2,2',4,4'-tetrahydroxybenzophenone. When necessary, the mixture may be subsequently agitated at 60–75° C. for several hours to complete the alkylation. It is then cooled to room temperature and neutralized with aqueous sodium bicarbonate. The organic phase is dried and concentrated under vacuum to yield the alkylated benzophenone product.

p-Toluene sulfonic acid is the preferred catalyst. At least 15 parts by weight, preferably 20 to 30 parts by weight, is used for every 100 parts by weight of the 2,2',4,4'-tetrahydroxybenzophenone. Dialkylation does not occur as readily when less catalyst is employed. In addition, high yields of product depend on dissolving the p-toluene sulfonic acid as well as possible in the solvent for the reactants before they are introduced. Optionally, sulfuric acid may be used to catalyze the alkylation; at least 7.5 parts by weight is needed.

Benzene is the preferred solvent. About 250 to 500 parts by weight is used for every 100 parts by weight of the 2,2',4,4'-tetrahydroxybenzophenone. Since benzene at room temperature does not dissolve p-toluene sulfonic acid very well, it is heated to about 60° C. before this catalyst is added; when the p-toluene sulfonic acid is in solution, the 2,2',4,4'-tetrahydroxybenzophenone may be introduced. Inert aromatic hydrocarbons such as toluene and m-xylene may be substituted for part or all of the benzene; chlorinated hydrocarbons such as o-dichlorobenzene may also be used.

Care should be taken to avoid overheating solid 2,2',4,4'-tetrahydroxybenzophenone which may adhere to the walls of the reaction vessel. The over-all yield can be lowered by the side reactions which result.

When the alkylation is finished it is often necessary to add an appropriate solvent to keep part of the product from separating. Water-immiscible reagents such as diethyl ether are preferred in order to minimize product loss to the water phase when the catalyst is neutralized by contacting the reaction mixture with aqueous sodium bicarbonate.

The compounds of this invention are significantly useful as ultra-violet screening agents. They can be incorporated into fibers, film, and coatings. These substrates thereby not only acquire enhanced protection against sunlight but in turn can act as filters to preserve other substrates from ultra-violet radiation. For example, thin sheets of "Butacite" polyvinyl butyral resin containing ditertiary-butyl-2,2',4,4'-tetrahydroxybenzophenone filter out rays which cause some colored fabrics to fade severely.

The subject benzophenones can be used in articles prepared from such polar elastomers as neoprene, copolymers of butadiene and styrene, copolymers of butadiene, acroylonitrile and polyurethanes. They can be introduced into polar plastics, such as polymethylmethacrylate, alkyl resins and cellulose esters.

The dialkylated benzophenones of the present invention are particularly valuable for protecting polyurethane compositions from the deleterious effect of exposure to ultra-violet radiation.

Polyurethane compositions which have been prepared from various polyols and organic polyisocyanates are useful in a wide variety of applications. It has been found, however, that in certain of these applications, such as in fibers, films and coatings, the polyurethane compositions are degraded by extended exposure to sunlight; for example, a serious loss in tensile strength occurs. This detrimental feature of photodegradation definitely exerts an adverse influence on customer acceptance of these compositions. It is believed that ultraviolet light of wavelengths in the range of about 3700–3900 A. units causes the observed photodegradation of these polyurethane compositions. Heretofore many organic compounds have been disclosed in the art for absorbing ultraviolet radiation. These compounds, however, have not proved to be entirely satisfactory when used with polyurethane compositions, either because they cannot be homogeneously mixed with said compositions or because they only provide a limited measure of protection. Example 1 demonstrates that 2,2',4,4'-tetrahydroxy-5,5'-di-tert-butylbenzophenone confers surprisingly better protection than 2,2',4,4' - tetrahydroxybenzophenone — a representative prior art ultra-violet absorber. This improvement is not only observed when comparisons are made at about equimolar concentrations but even when the same weight of benzophenone is used. The degree of protection which can be attained is believed to be superior to that provided by 2,2',4,4'-tetrahydroxybenzophenone at any usable concentration.

The stabilized polyurethane compositions may be prepared by several general procedures. The most convenient of these is to prepare an isocyanate-terminated polyurethane polymer from the reaction of a molar excess of one or more organic polyisocyanates with one or more organic polyols. The benzophenone compound is then added to this polyurethane polymer and the polymer is then chain extended by means of water, an aliphatic polyol, an arylene diamine or hydrazine. For example, this chain extension can be effected by casting the isocyanate-terminated polyurethane polymer as a film or coating and exposing the same to atmospheric moisture over a period of time. In the preparation of molded articles, the isocyanate-terminated polyurethane polymer containing the substituted benzophenone may be chain extended by means of an aliphatic polyol or an arylene diamine. When elastomeric articles are prepared, the isocyanate-terminated polyurethane polymer may be chain extended to yield the ultimate polyurethane composition and the benzophenone compound then incorporated with the composition by means of milling. A fiber can be spun from a solution containing a hydrazine chain-extended polyurethane composition, and the benzophenone compound. When preparing linear high molecular weight polyurethane articles (such as fibers) it is preferred to complete the chain extension before introducing the substituted benzophenone compound.

Generally, the benzophenone compound is added to a fluid polyurethane polymer by conventional agitation. The mixture obtained is then chain extended by means of water, an aliphatic polyol or an arylene diamine. In dilute solution the polyurethane polymer may be chain extended with hydrazine. Alternatively, the benzophenone compound may be introduced after the chain extending agents have been added. This is preferred when hydrazine-extended polymers are made. When elastomeric stock is prepared, the unstabilized fluid polyurethane polymer may be incompletely chain extended to give a workable solid; the benzophenone compound may be incorporated by milling; chain extension is then completed by milling in hindered arylene diamines or aliphatic polyols and curing the compounded stock in a heated mold.

For every 100 parts by weight of the polyurethane composition from about 0.1 to 3 parts by weight of the subject benzophenone compound should be used with a preferred concentration ranging from about 0.5 to 2.0 parts by weight. It is to be understood that mixtures of the benzophenone compounds may be used. Since these benzophenones do have a pale yellow color, it is recommended that when substantially colorless polyurethane films or coatings are desired, the concentration of the benzophenone compound not exceed about 1.0 part by weight for every 100 parts by weight of the polyurethane product.

Various polymeric organic polyols may be used to prepare the polyurethane compositions, including polyalkyleneether glycols, polyalkyleneether-thioether glycols, polyalkylene-aryleneether glycols and polyesters which contain a plurality of hydroxyl groups. The useful polymeric polyol molecular weight depends on operating convenience and on the contemplated application of the polyurethane product. In general, the polymeric polyol molecular weight may range from about 400 to about 6000, with a preferred range of from about 400 to about 2000.

In preparing the isocyanate-terminated polyurethane polymer, any of a wide variety of organic polyisocyanates may be used, either alone or as isomer mixtures or as mixtures of diisocyanates. Representative compounds include toluene-2,4-diisocyanate, 4-methoxy-1,3-phenylenediisocyanate, 4-isopropyl-1,3-phenylenediisocyanate, 4-ethoxy - 1,3 - phenylenediisocyanate, 2,4' - diisocyanatodiphenylether, 3,3 - dimethyl - 4,4' - diisocyanatodiphenylmethane, 1,5 - naphthalenediisocyanate, mesitylene diisocyanate, durylene-diisocyanate, xylylene diisocyanate and hexamethylene diisocyanate. The preferred isomer mixture contains 80% toluene-2,4-diisocyanate and 20% toluene-2,6-diisocyanate. Triisocyanates such as toluene-2,4,6-triisocyanate and 2,4,4'-triisocyanato-diphenylether may be used to provide additional crosslinking.

The isocyanate-terminated polymers are prepared by reacting a molar excess of an arylene polyisocyanate with an organic polyol under substantially anhydrous conditions. Agitation is normally employed to secure thorough mixing of the reactants and to aid in temperature control. About 1 to 2 hours is generally required to complete the reaction at 100° C. A correspondingly longer time is needed below 100° C., e.g., about 4 to 8 hours at 70° C. Optionally, the reaction can be carried out at temperatures above 100° C. to shorten the time required and to introduce additional crosslinking by side reactions such as allophanate formation (which becomes quite noticeable at about 140° C.). Optionally, the process may be carried out in more than one step.

The following examples will better illustrate the nature of the present invention; however, the invention is not intended to be limited to these examples. Parts are by weight unless otherwise indicated.

The tensile strength ($T_B$), extension at break ($E_B$), and modulus at 300% extension ($M_{300}$) are determined at 25° C. in accordance with ASTM procedure D412–51T.

The aging caused by exposure to ultra-violet light is carried out in a Color Fade-Ometer operated according to Tentative Test Method 16A–54 (1955 Technical Manual and Year Book of the American Association of Textile Chemists and Colorists, vol. XXXI, pp. 79–82).

PREPARATION OF ISOCYANATE-TERMINATED POLYURETHANE POLYMER A 278.7 parts of toluene-2,4-diisocyanate and 1000 parts of anhydrous polytetramethyleneether glycol (molecular weight 1000) are agitated at 80° C. for 4 hours in a dry reaction vessel protected from atmospheric moisture. Polymer A thus obtained has a free isocyanate content of 4.2%, a Brookfield viscosity at 30° C. of about 16,500 cps., and a number-average molecular weight of about 2000.

Representative examples illustrating the present invention are as follows.

*Example 1*

(A) 31 parts (0.126 mole) of 2,2',4,4'-tetrahydroxybenzophenone, 132 parts of benzene, and 10 parts of p-toluene sulfonic acid are heated to 70° C. while agitated. Nitrogen is introduced to displace air from the reaction vessel. The flow of nitrogen is then stopped and 22.4 parts (0.4 mole) isobutylene is bubbled steadily into the mixture during the next 2 hours while the temperature is maintained at 70° C. The benzophenone compound dissolves as the reaction proceeds. Introduction of isobutylene is stopped and the mixture is cooled to room temperature. 135 parts of ethyl acetate is added to keep the product in solution. The solution is shaken with 3 portions of water and is finally neutralized with a dilute sodium bicarbonate solution. The organic layer is then dried over anhydrous magnesium sulfate and concentrated under vacuum to yield 35 parts of (77% yield) crystals melting at 206° C.

The 5,5' - di - tert - butyl - 2,2'4,4' - tetrahydroxybenzophenone obtained has an absorption maximum (0.0101 mg./ml. concentration in methanol) at 3570 A. having a molar extinction coefficient of 14,670. [2,2',4,4'-tetrahydroxybenzophenone has an absorption maximum at 3430 A. and a molar extinction coefficient of 14,000.]

(B) To 100 parts of polymer A at 60–80° C. is added with stirring 1 part (0.00279 mole) of the 5,5'-di-tert-butyl-2,2',4,4'-tetrahydroxybenzophenone prepared in A above. The mixture thus obtained is cast onto a flat glass surface and cured by exposure (for a week) to ambient atmospheric moisture vapor in the absence of direct sunlight. A tough, colorless, transparent film about 14 to 18 mils. in thickness is obtained.

(C) The procedure of part B above is repeated except that 1.8 parts (0.00502 mole) of the benzophenone compound is used.

(D) The procedure of Part B above is repeated except that 1 part (0.00406 mole) 2,2',4,4'-tetrahydroxybenzophenone is used in place of 1 part (0.00279 mole) of 5,5'-di-tert-butyl-2,2',4,4'-tetrahydroxybenzophenone.

(E) Films B, C and D made by the procedures of parts B, C and D above, respectively, are aged in a Fade-Ometer. Aging of film D is discontinued after 120 exposure hours because its tensile strength by then is already below 50% of its initial value. Aging of film B is discontinued for a similar reason after 170 exposure hours. Film C retains over 80% of its initial tensile strength for at least 210 exposure hours; its aging is continued for 40 more exposure hours. The data obtained are given in Table I which follows:

TABLE I

| Exposure Hours | $T_B$ Film | | | $E_B$ Film | | | $M_{300}$ Film | | |
| --- | --- | --- | --- | --- | --- | --- | --- | --- | --- |
| | D | B | C | D | B | C | D | B | C |
| 0 | 6,400 | 6,050 | 6,500 | 550 | 540 | 520 | 1,250 | 1,200 | 1,350 |
| 40 | | 5,100 | | | 570 | | | 1,000 | |
| 80 | 4,800 | 5,600 | | 840 | 560 | | 850 | 1,100 | |
| 115 | | 4,000 | | | 720 | | | 910 | |
| 120 | 2,300 | | | 890 | | | 725 | | |
| 135 | | 4,050 | | | 710 | | | 850 | |
| 150 | | | 6,400 | | | 580 | | | 1,240 |
| 155 | | 4,000 | | | 620 | | | 940 | |
| 170 | | 2,750 | | | 750 | | | 700 | |
| 210 | | | 5,300 | | | 710 | | | 1,035 |
| 240 | | | 3,600 | | | 740 | | | 970 |
| 250 | | | 2,700 | | | 860 | | | 860 |

It is quite apparent from the foregoing example that the use of the subject benzophenone ultra-violet light absorber compound brings about a significant stabilization of a polyurethane composition. Any polyurethane composition stabilized in this manner is particularly useful in applications where ability to withstand exposure to sunlight is important, such as in the field of fibers, filaments and coatings. Fluid isocyanate-terminated polyurethane compositions (such as polymer A) to which the benzophenone compound and arylene diamine chain-extending agents have been added, are valuable as non-shrinking caulking compounds and for coating fabrics. They can be cast and molded to make gaskets and automotive rubber parts. They can be blended with epoxy resins for the incapsulation and potting of electronic equipment.

*Example 2*

25 parts of p-toluenesulfonic acid is dissolved with agitation at 60° C. in 352 parts of benzene. 100 parts (0.407 mole) of 2,2',4,4'-tetrahydroxybenzophenone is suspended with stirring in the above solution at about 65° C. Nitrogen is introduced to displace air from the reaction vessel. The flow of nitrogen is then stopped and 74.4 parts (1.33 moles) of isobutylene is bubbled steadily into the mixture during the following 3 hours while the temperature is maintained between 65–70° C. The suspension changes to a homogeneous solution during this period. Introduction of isobutylene is stopped and the mixture is cooled to room temperature. 142 parts of diethyl ether is added to keep the product in solution. 17 parts of sodium bicarbonate dissolved in 150 parts of water is slowly added to this solution with stirring to neutralize the p-toluene sulfonic acid. The organic layer is then separated and dried over anhydrous magnesium sulfate. The solvent is stripped off to give an essentially quantitative yield of 5,5'-di-tert-butyl-2,2',4,4'-tetrahydroxybenzophenone.

*Example 3*

A. 70 parts (1 mole) of 2-methyl-butene-1 is added with stirring over a period of one hour and 40 minutes to 50 parts (0.203 mole) of 2,2',4,4'-tetrahydroxybenzophenone, 20 parts of p-toluene sulfonic acid, and 200 parts of benzene which are contained at a temperature between 65–70° C. in a reaction vessel which has been swept with nitrogen. When the addition is finished, the mixture is agitated at about 70° C. for 3 hours and then at room temperature for about 16 hours. Aqueous sodium carbonate is introduced to neutralize the mixture which is extracted twice with 90 parts of ethyl acetate and finally with 264 parts of benzene. The organic layers are collected, dried over magnesium sulfate, and concentrated to yield 23 parts (29% of theory) of product sintering at 153° C., melting at 160° C.

*Analysis.*—Calc'd. for $C_{23}H_{30}O_5$: C, 71.5; H, 7.8. Found: C, 71.5; H, 8.0.

The di-tertiary-amyl-2,2',4,4'-tetrahydroxybenzophenone obtained has an absorption maximum at 3580 A. having a molar extinction coefficient of 14,590.

(B) To 100 parts of polymer A at 60–80° C. is added with stirring 1 part of the 5,5'-di-tert-amyl-2,2',4,4'-tetrahydroxybenzophenone prepared in A above. The mixture thus obtained is cast onto a flat glass surface and cured by exposure for a week to ambient atmospheric moisture vapor in the absence of direct sunlight. A tough, colorless, transparent film about 14 to 18 mils in thickness is obtained.

(C) The procedure of part B above is repeated except that 1.8 parts of the benzophenone compound is used.

(D) Films B and C made by the procedures of parts B and C above, respectively, are aged in a Fade-Ometer. Aging of film B is discontinued after 200 exposure hours because its tensile strength by then has fallen below 25% of its initial value. Aging of film C is continued. After 250 exposure hours it still retains about 70% of its initial tensile strength. The data obtained are given in Table II which follows:

TABLE II

| Exposure Hours | $T_B$ | | $E_B$ | | $M_{300}$ | |
| --- | --- | --- | --- | --- | --- | --- |
| | Film B | Film C | Film B | Film C | Film B | Film C |
| 0 | 6,350 | 5,950 | 570 | 580 | 1,380 | 1,290 |
| 120 | 5,400 | | 590 | | 1,240 | |
| 160 | 5,750 | | 660 | | 1,100 | |
| 180 | 3,400 | | 720 | | 970 | |
| 200 | 1,480 | | 610 | | 940 | |
| 220 | | 4,200 | | 720 | | 950 |
| 250 | | 4,150 | | 690 | | 1,000 |

*Example 4*

(A) A red fabric covered with a sheet of "Butacite" polyvinyl butyral resin is aged in a Fade-Ometer for 35 hours. The red color fades severely.

(B) The process of part A is repeated except that the "Butacite" contains 0.05% by weight 2,2',4,4'-tetrahydroxybenzophenone. The fabric does not fade as badly as it did in part A.

(C) The process of part A is repeated except that the "Butacite" contains 0.05% by weight 5,5'-di-tert-butyl-2,2',4,4'-tetrahydroxybenzophenone. The fabric fades noticeably less than it did in part B.

Example 5

(A) 104 parts of mesitylene diisocyanate and 300 parts of polytetramethyleneether glycol (molecular weight 1000) are agitated at 80° C. for 4 hours in a dry reaction vessel protected from atmospheric moisture. Polymer B thus obtained is a fluid polyurethane composition having a free isocyanate content of about 4.5%.

(B) To 100 parts of polymer B at 60-80° C. is added with stirring 1.8 parts of 5,5'-di-tert-butyl-2,2',4,4'-tetrahydroxybenzophenone. The mixture thus obtained is cast onto a flat glass surface and cured by exposure (for a week) to ambient atmospheric moisture vapor in the absence of direct sunlight. A tough transparent film about 14 to 18 mils in thickness is obtained.

(C) The procedure of part B above is repeated except that 2,2',4,4'-tetrahydroxybenzophenone is substituted for 5,5'-di-tert-butyl-2,2',4,4'-tetrahydroxybenzophenone.

(D) The procedure of part B above is repeated except that no benzophenone compound is used.

(E) Films B, C and D made by the procedures of parts B, C and D above, respectively, are aged in a Fade-Ometer. Aging of film D deteriorates rapidly and cannot be tested after 5 exposure hours. Aging of film C is discontinued after 120 exposure hours because the tensile strength has fallen below 80% of its initial value. Film B still retains about half its initial tensile strength after 240 exposure hours. The data obtained are given in Table III which follows:

TABLE III

| Exposure Hours | Film B— $T_B/E_B/M_{300}$ | Film C— $T_B/E_B/M_{300}$ | Film D— $T_B/E_B/M_{300}$ |
|---|---|---|---|
| 0 | 6,350/540/1,680 | 7,100/510/1,780 | 6,750/530/1,700. |
| 5 | not tested | not tested | 6,000/540/1,530. broke before test. |
| 15 | do | do | not tested. |
| 60 | do | 5,300/520/1,440 | Do. |
| 80 | do | 4,500/570/1,280 | Do. |
| 100 | do | 4,800/640/1,000 | Do. |
| 120 | 6,700/600/1,520 | 1,080/120/— | Do. |
| 175 | 6,950/460/1,900 | not tested | Do. |
| 200 | 4,900/540/1,520 | do | Do. |
| 240 | 3,200/540/1,350 | do | Do. |

This application is a continuation-in-part of copending application Serial No. 776,675, filed November 28, 1958, now abandoned.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A compound having the structure

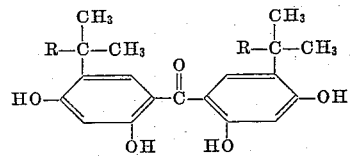

wherein R is taken from the group consisting of a $C_1$ and a $C_2$ alkyl radical, with the proviso that both the R's need not be the same.

2. The compound 5,5'-di-tertiary-butyl-2,2',4,4'-tetrahydroxybenzophenone.

3. The compound 5,5'-di-tertiary-amyl-2,2',4,4'-tetrahydroxybenzophenone.

4. The compound 5'-tertiary-amyl-5-tertiary-butyl-2,2',4,4'-tetrahydroxybenzophenone.

References Cited in the file of this patent

UNITED STATES PATENTS 2,789,140  Von Glahn et al. _____ Apr. 16, 1957

FOREIGN PATENTS 1,220,656  France _____ Jan. 4, 1960